US007395876B1

(12) United States Patent
Walker

(10) Patent No.: US 7,395,876 B1
(45) Date of Patent: Jul. 8, 2008

(54) DRILL DRIVER

(75) Inventor: Andrew Walker, Durham (GB)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 11/677,154

(22) Filed: Feb. 21, 2007

(51) Int. Cl.
*E21B 3/00* (2006.01)
*F16H 48/06* (2006.01)

(52) U.S. Cl. ....................... 173/217; 173/216; 173/170; 173/164; 475/250; 475/232

(58) Field of Classification Search ................. 173/217, 173/216, 214; 475/248, 250, 299, 332
See application file for complete search history.

(56) References Cited

U.S. PATENT DOCUMENTS

| | | | | | |
|---|---|---|---|---|---|
| 1,379,880 | A * | 5/1921 | Seaborn | 433/130 |
| 1,525,091 | A * | 2/1925 | Savidge | 74/665 R |
| 2,679,770 | A * | 6/1954 | Carter et al. | 173/214 |
| 2,742,796 | A | 4/1956 | Zorich | |
| 2,976,436 | A * | 3/1961 | Anton | 173/50 |
| 3,203,275 | A * | 8/1965 | Hoover | 74/665 GA |
| 4,653,356 | A * | 3/1987 | Golden | 81/57.14 |
| 4,912,349 | A * | 3/1990 | Chang | 310/50 |
| 5,022,131 | A * | 6/1991 | Hobbs | 29/40 |
| 5,065,498 | A * | 11/1991 | McKenzie | 483/57 |
| 5,149,230 | A * | 9/1992 | Nett | 408/42 |
| 5,161,437 | A * | 11/1992 | Yasutomi et al. | 81/57.14 |
| 5,261,135 | A * | 11/1993 | Mitchell | 7/158 |
| 5,354,246 | A * | 10/1994 | Gotman | 475/248 |
| 5,540,629 | A | 7/1996 | Gotman | |
| 5,553,519 | A * | 9/1996 | Pettit, Jr. | 81/56 |
| 6,321,856 | B1 * | 11/2001 | Alsruhe | 173/217 |
| 6,487,940 | B2 * | 12/2002 | Hart et al. | 81/57.14 |
| 6,715,969 | B2 * | 4/2004 | Eriksen | 408/35 |
| 7,191,677 | B2 * | 3/2007 | Barkdoll | 74/396 |
| 2003/0110645 | A1 * | 6/2003 | Phillips et al. | 30/392 |

FOREIGN PATENT DOCUMENTS

| | | |
|---|---|---|
| DE | 3834886 | 4/1990 |
| EP | 0498681 | 8/1992 |

* cited by examiner

*Primary Examiner*—Rinaldi Rada
*Assistant Examiner*—Gloria R. Weeks
(74) *Attorney, Agent, or Firm*—Bruce S. Shapiro; Wesley W. Muller

(57) ABSTRACT

A drill/driver (2) includes first (32) and second (52) drive shaft. The two drive shafts (32, 52) are independently rotatable about respective axes (A-A, B-B) thereby to selectably choose the radial and axial position of the final output drive of the drill/driver.

A shaft lock (56) is provided to enable the user to selectively lock either or both of the shafts (32, 52) against rotation about their respective axes.

12 Claims, 13 Drawing Sheets

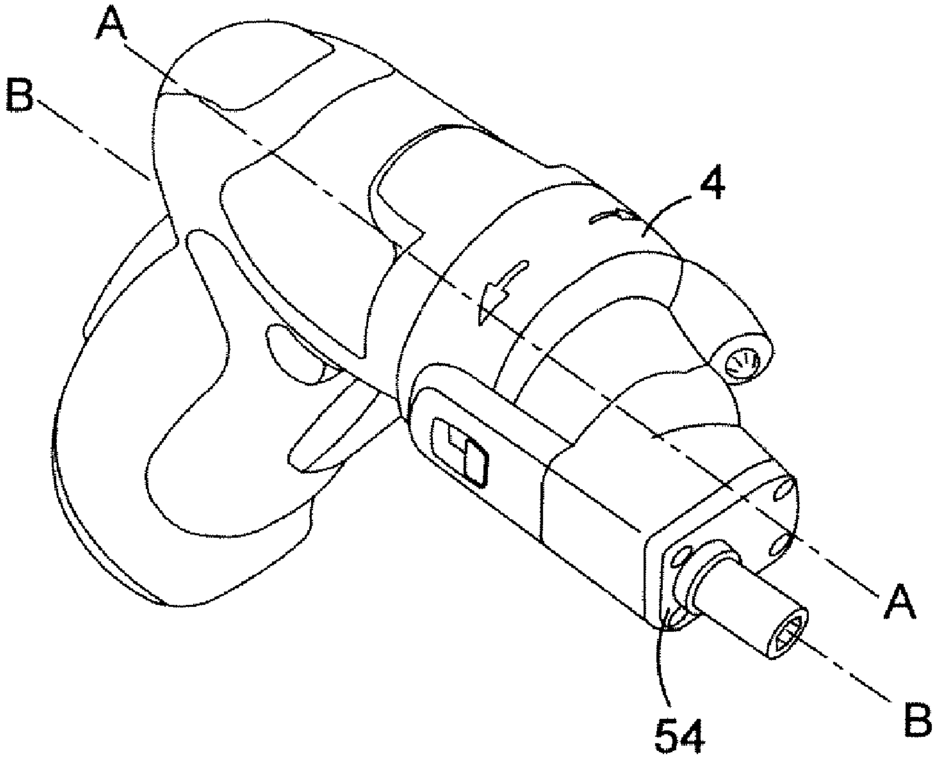
FIG.6(a)
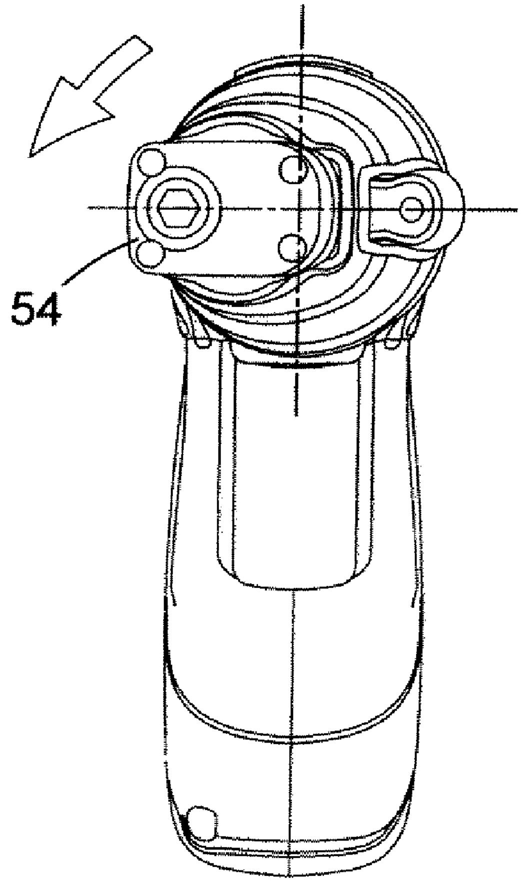

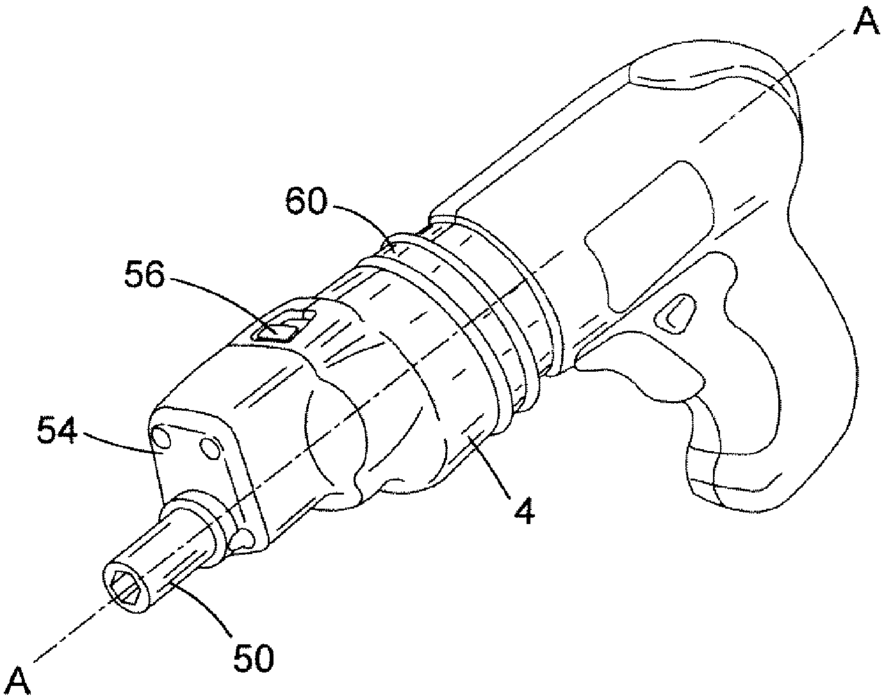
FIG.9
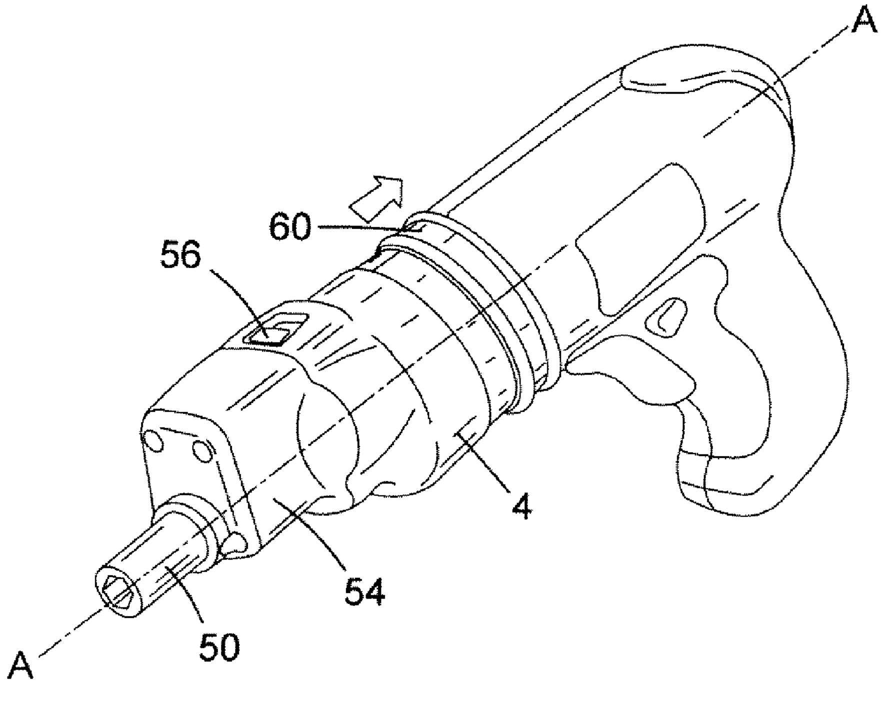

DRILL DRIVER

FIELD OF THE INVENTION

Drill/drivers are known for providing rotating shafts to which may be coupled drilling bits or screw driving bits, for example. Although there are many varieties of drill/driver, they all have in common the need to provide rotational force to the attached drilling or screw driving bit.

BACKGROUND OF THE INVENTION

Furthermore most drill/drivers define a central axis along which the output shaft and the attached bit lie and, hence, rotate.

Should the body of the drill/driver be bulky, however, it is possible for some areas of potential use to become inaccessible. For example, a large battery for powering the drill/driver, or a large integral gearbox could make its outer dimensions so large that they extend far beyond the lateral sides of the drill/driver output shaft or its attached bit. This could mean, therefore, that the operator of the drill/driver is unable to use it in enclosed spaces (or next to walls) as the sheer bulk is too great to permit alignment of the bit with the work piece it is intended for the bit to act upon.

The possibility, therefore, of being able to axially offset the output shaft of a drill/driver relative to the central output axis is an attractive proposition, as this allows greater accessibility to confined areas, particularly with a hexagonal bit drive output spindle of relatively small diameter compared to the overall outside dimensions of the drill/driver. If, for example, the drill/driver were to utilise a relatively large chuck (large as compared to the overall outside dimensions of the drill/driver) then little advantage would be gained from being able to axially offset the position of the chuck, or its drive shaft. Such proposals are known and one example is that of a screwdriver sold by the Japanese tool manufacturer, National, under model number EZ 7680. This screwdriver has an output shaft which is permanently axially offset from the central motor output shaft, yet is freely rotatable in a plurality of positions thereabout. The output shaft may be locked in any one of these plurality of positions.

DE-A-3834886 discloses a hand-held electric drill having a gearbox 7 with the tool spindle 8 laterally offset with respect to the motor 2 armature shaft 3 and coupled therewith via gearing. The gearbox housing 10 is mounted to the front end of the motor housing 1 so that it can be angularly adjusted or rotated and is held in a fixed position by means of a connection ring 11 which ma be a clamp and can comprise indexing means.

However, in certain circumstances an operator of a drill/driver may wish to lock the output shaft against rotation thereby to facilitate manual operation of a screwdriver bit or a drill bit. This need may arise where delicate or controlled drilling or screwdriver work is required such as in fragile work pieces. Using a drill/driver such as the National toot described above in these circumstances, however, is not ideal. The fact that the output shaft is radially offset from the central drive shaft of the drill/driver means that very often a uniform application of torque in a manual mode is not possible. Even if it is possible, however, because the axis of application of applied force is not central with the axis of application of output drive, then problems such as slipping of the screwdriver bit from the screw head due to misalignment, for example, can occur.

A drill/driver which combines the facility to radially offset the rotational shaft driving the screwdriver bit or drill bit with the facility to allow the rotational drive shaft to be coaxial or collinear with the shaft along which the force is applied for use in a manual mode is a desirable aim.

BRIEF SUMMARY OF THE INVENTION

It is, therefore, an aim of the present invention to at least alleviate the above-mentioned shortcomings. Accordingly the present invention provides a drill/driver including:

a motor for rotating a motor output shaft;

a gearbox coupled to the motor output shaft and having a gearbox output shaft, the gearbox arranged to provide a change in rotational speed as between the motor output shaft and the gearbox output shaft and wherein the gearbox output shaft defines a first central output axis of the drill/driver;

a first offset output gear driven by and coupled to the gearbox output shaft, wherein the first offset output gear is radially offset from the first central output axis and is freely rotatable thereabout; the first offset output gear itself defining a second axis, which second axis is offset from, parallel to and rotatable about the first central output axis;

a second offset output gear driven by and coupled to the first offset gear, wherein the second offset output gear is radially offset from the second axis defined by the first output gear and wherein the second offset output gear is freely rotatable about the second axis;

wherein the first and second offset output gears are rotatably adjustable about the first central output axis and the second axis respectively, thereby to permit the second offset gear to be selectably co-axial with the first central output axis, or radially offset therefrom, and wherein the second offset output gear drives a final output shaft of the drill/driver.

By provision of a drill/driver employing two independently adjustable axes about which each of two offset output gears is able to be rotated independently of the other offset output gear, then the facility is provided to allow the final drive shaft of the drill/driver to be adjusted by the drill/driver user to be aligned in any number of positions varying between being collinear with the gearbox output shaft (i.e. centrally positioned with respect to the body of the drill/driver) to being parallel to, but radially offset therefrom in any desired orientation (that is, the radial extent of the axial offset and the angular orientation about the central gearbox axis) about the axis of rotation of the gearbox output shaft.

Preferably the first offset output gear drives a first offset drive shaft with the first offset drive shaft being parallel to, but axially offset from the first central output axis. This allows the drill/driver to have ergonomic characteristics of good length for ease of manual use. Although use of the gear itself will suffice without the need for it to be coupled to an extending shaft, it is often useful for the entire drill/driver to have sufficient length for a user to be able to hold comfortably over extended periods of time. Furthermore, having a longitudinal (i.e. along the axis) separation of the first offset output gear and the second offset output gear permits a greater choice of gear diameters which in turn permits a more flexible range of offset radii. Furthermore, the first offset drive shaft may carry, at its end remote from the first offset output gear, a pinion, which pinion engages the second output gear.

Preferably the second offset output gear is coupled to, and drives, the final output shaft of the drill/driver.

Additionally or alternatively the final output shaft may sit within a second bearing, which second bearing is journalled for rotation about the first offset drive shaft. Also the final output shaft may sit within a second bearing, which second bearing is journalled for rotation about the first offset drive shaft.

BRIEF DESCRIPTION OF THE DRAWINGS

The present invention will now be described, by way of example only and with reference to the accompanying drawings, of which;

FIG. 9 illustrates schematically a side view of yet another embodiment of the present invention, and:

DETAILED DESCRIPTION OF THE INVENTION

Figure 1:
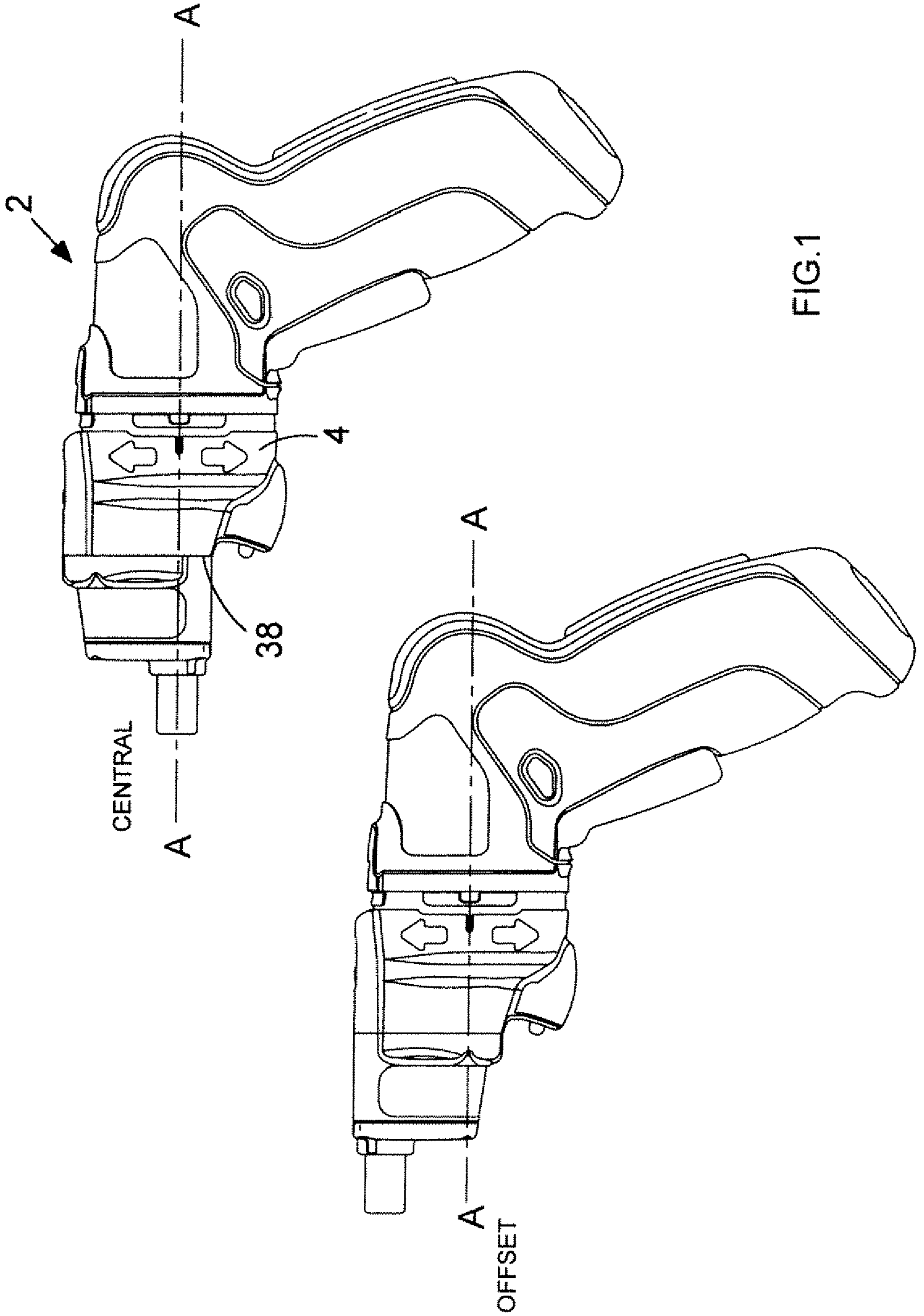
FIG. 1 shows a side elevation of a drill/driver in accordance with an embodiment of the present invention.
Figure 2:
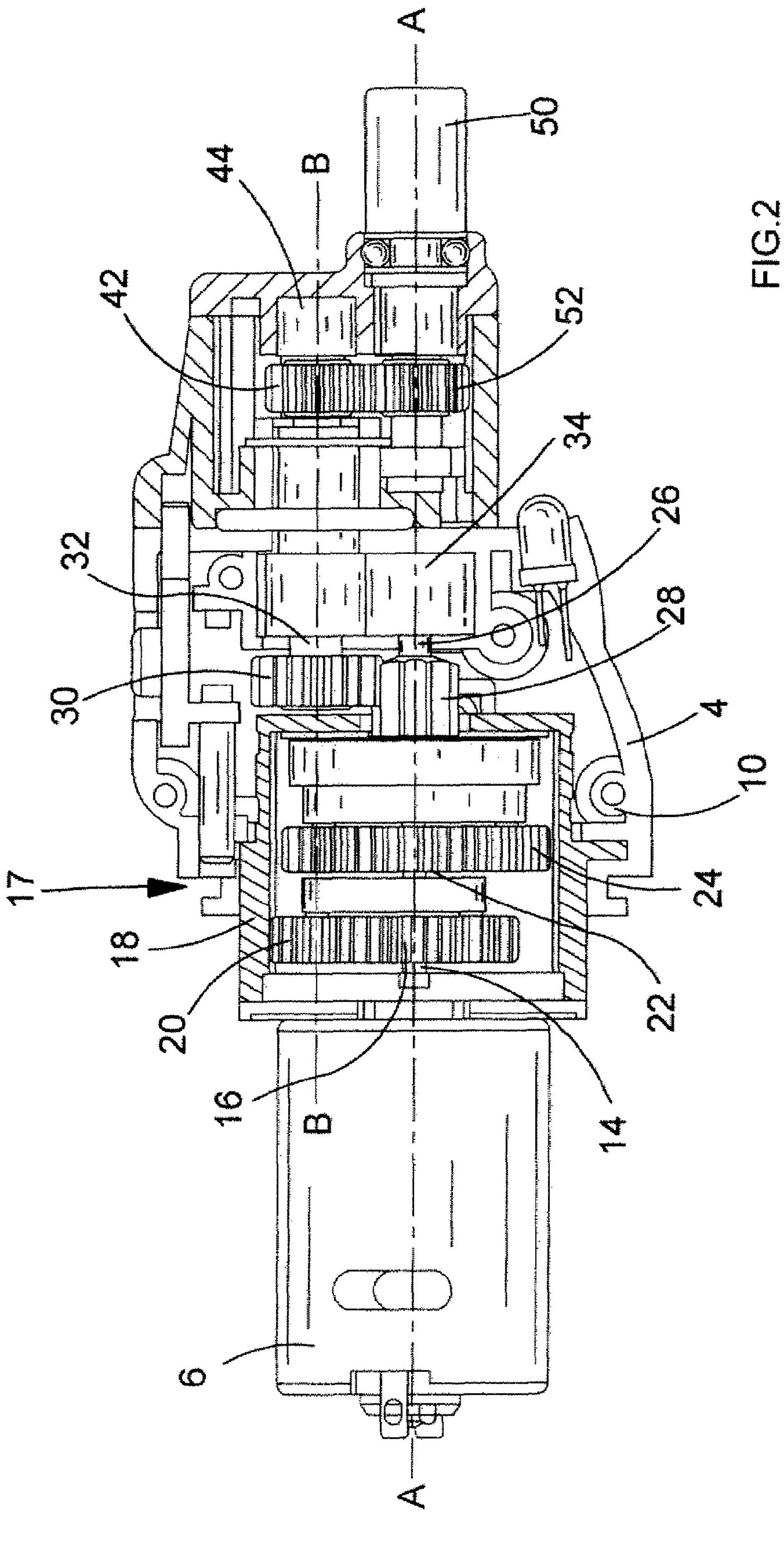
FIG. 2 shows a sectional view of part of the internal mechanism of the drill/driver of FIG. 1.
Figure 3:
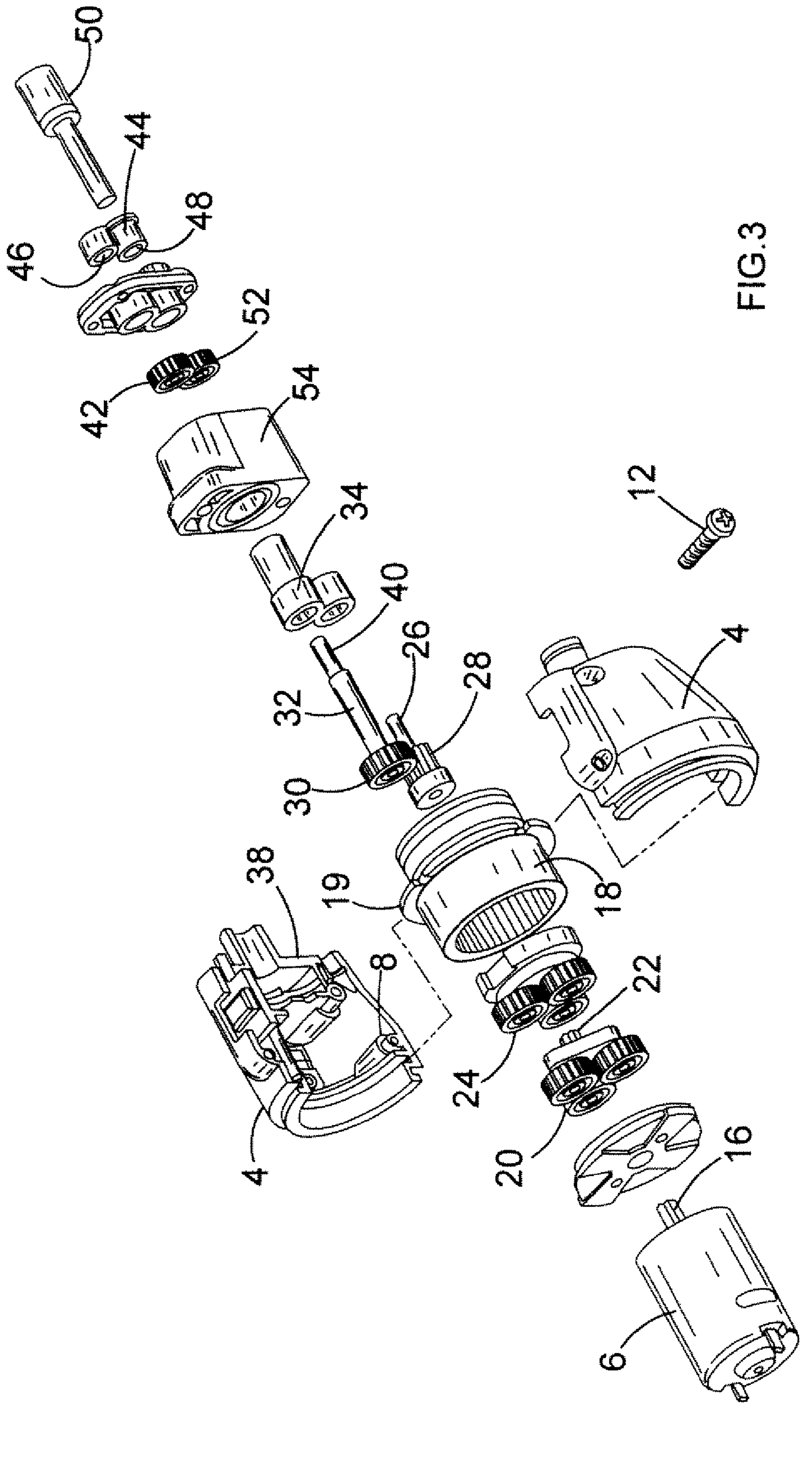
FIG. 3 shows an exploded perspective view of FIG. 2.
Figure 4:
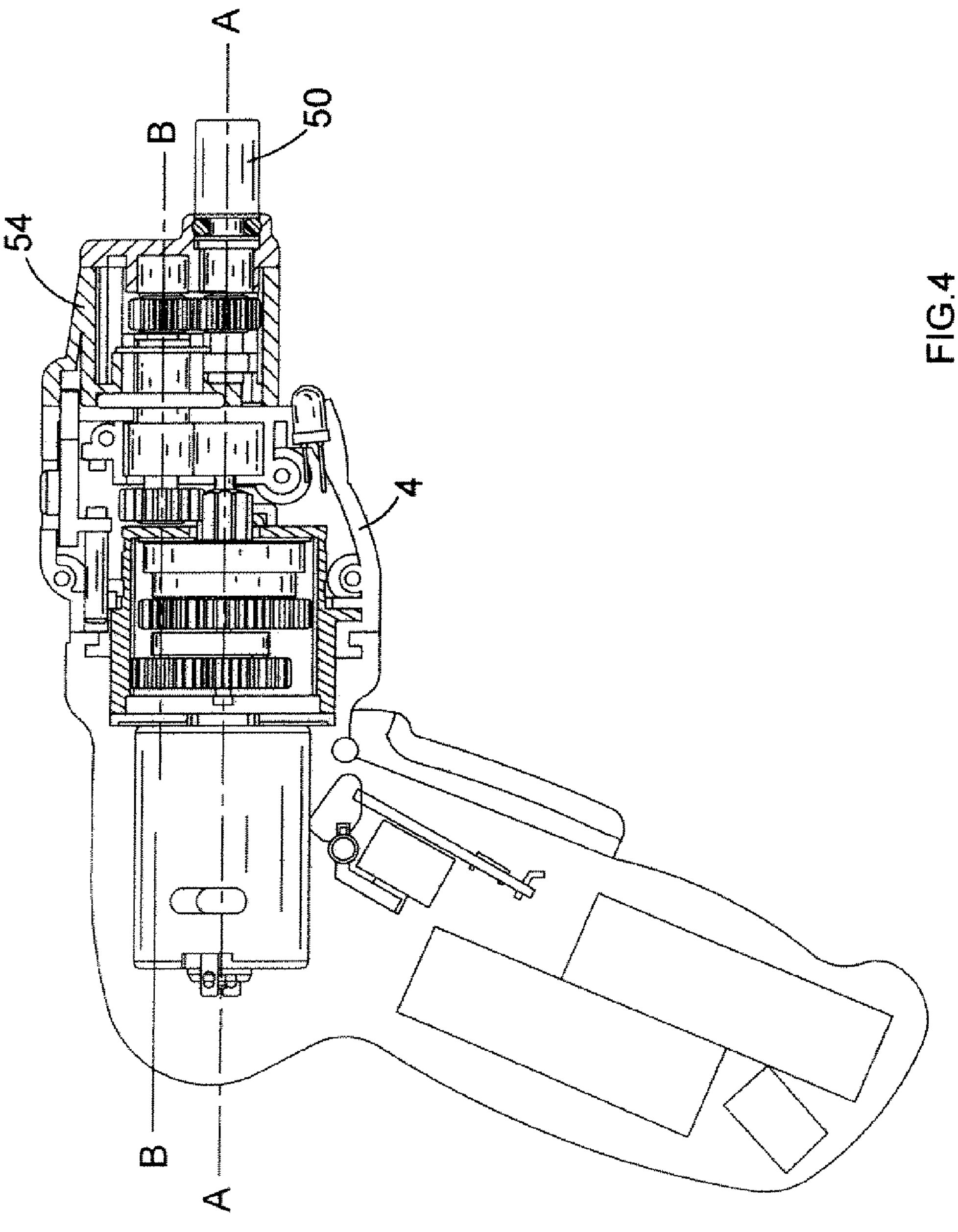
FIG. 4 shows a part cut-away side view of the drill/driver of FIG. 1, from the opposite side.

Referring now to FIGS. 1, 2 and 3, it can be seen that a drill/driver, shown generally as 2 has an outer casing 4 encapsulating an electric motor 6. The motor 6 is, in this example, powered by rechargeable batteries (not shown), but could, equally, be powered by mains electricity, for example. The outer case 4 is formed from two half-portions which fit together to surround the motor 6, in known manner. Once the two portion halves of the casing 4 are brought together to encapsulate the motor 6, it can be seen that they form a generally rounded cylinder therearound. This is designed to be easily grasped by the hand of an operator. Registration and retention of the casing 4 halves is achieved by way of projecting spigots 8 formed on one of the halves mating with corresponding recesses 10 in the other half. Screws 12 pass through both the spigot 8 and the recess 10 and engage with a corresponding screwthread formed on the internal surface of the spigot 8.

The motor 6 drives a motor output shaft 14 to which is mounted a motor output gear 16. The axis of rotation of the shaft 14 is arranged to be the main, or central, axis of the drill/driver, A-A. This follows convention and ensures maximum comfort for the operator during use of the drill/driver. The gear 16 forms the drive, or input, to an epicyclic gearbox arrangement, shown generally as 17. Such gear arrangements 17 are well known to those skilled in the art, but the gear 16 is referred to as the central, or "sun" gear which drives peripheral, or "planet" gears 20 which engage with an outer ring gear 18 which has internal gear teeth, as is conventional. As is known, this sun-planet arrangement of geared drive results in the planet gears 20 rotating at a reduced rate about and compared to their driving sun gear 16. The teeth of the planet gears 20 intermesh with the teeth of the ring gear 18 as the planet gears 20 rotate within the ring gear 18 under the drive of the sun gear 16.

In the epicyclic gearbox 17 of this example, the output of the planet gears 20 is a further gear 22. This further gear 22 becomes another "sun" gear driving another set of "planet" gears 24 within the internal ring gear 18. The planet gears 24, again, rotate at a lower rate than their sun drive gear 22. The net result, therefore, of this two-stage epicyclic gearbox arrangement is a step-down in rotational speed as between the motor gear 16 and the output of the second planet gears 24.

The output of the second planet gear 24 is the gearbox output shaft 26. This gearbox output shaft 26 also rotates about the axis A-A which is the axis of rotation of the motor output shaft 14. Furthermore the axis of rotation of the shaft 26 defines a first central output axis of the drill/driver. Mounted to the shaft 26 is an output shaft drive gear 28.

The drive gear 28 engages with and drives a first offset output gear 30. Although in this example the first offset output gear 30 is directly driven by the gear 28, it will be appreciated that the gear 30 is coupled to and driven by the gearbox output shaft 26 via the gear 28. The gear 30 is mounted upon and restrained against free rotation about a first offset drive shaft 32 which drive shaft is journalled for free rotation within a bearing 34. Thus rotation of the gear 28 causes concomitant rotation of the gear 30. As gear 30 can only rotate with the shaft 32 via bearing 34, this causes rotation of the shaft 32. The shaft 32 is parallel with, but axially offset from, the axis A-A and the gearbox output shaft 26. The shaft 32 is rotatable about, and defines, a second axis of rotation, B-B. As will be explained below, however, the locus of the axis B-B is not fixed, by may be varied around a circumference.

It can be seen from FIG. 2 that the bearing 34 is also journalled for free rotation about the shaft 26 and, hence, the axis A-A. This means, therefore, that the angular disposition of the shaft 32 about the shaft 26 can vary over 360°. As will be described in more detail below, this allows the operator of the drill/driver to select the position of the shaft 32 about the shaft 26 to suit the particular circumstances of use of the drill/driver. To achieve this, the bearing 34 is mounted non-rotatably to and within casing 4, such that rotation by the operator of the casing 4 causes rotation of the entire bearing arrangement 34 (and, hence the shaft 32) about the axis A-A in order to adjust the angular disposition of the shaft 32 (and, therefore the axis B-B) about the shaft 26. It will be understood that the centre of the circle about which casing 4 may freely rotate is also the central axis A-A.

Figure 6B:
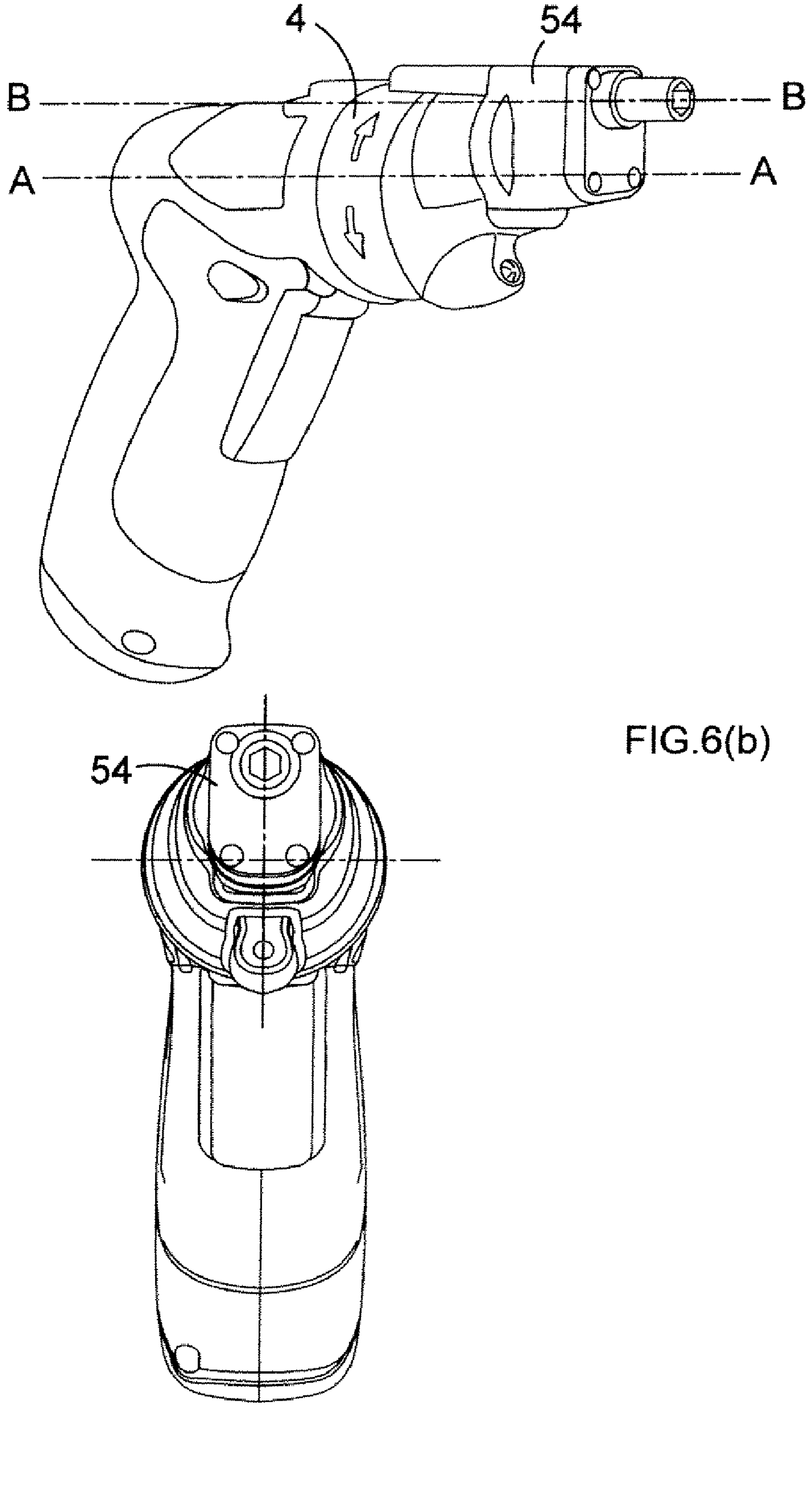
FIG. 6 illustrates the rotation of the first output shaft about the axis of the main housing and motor.
Figure 6C:
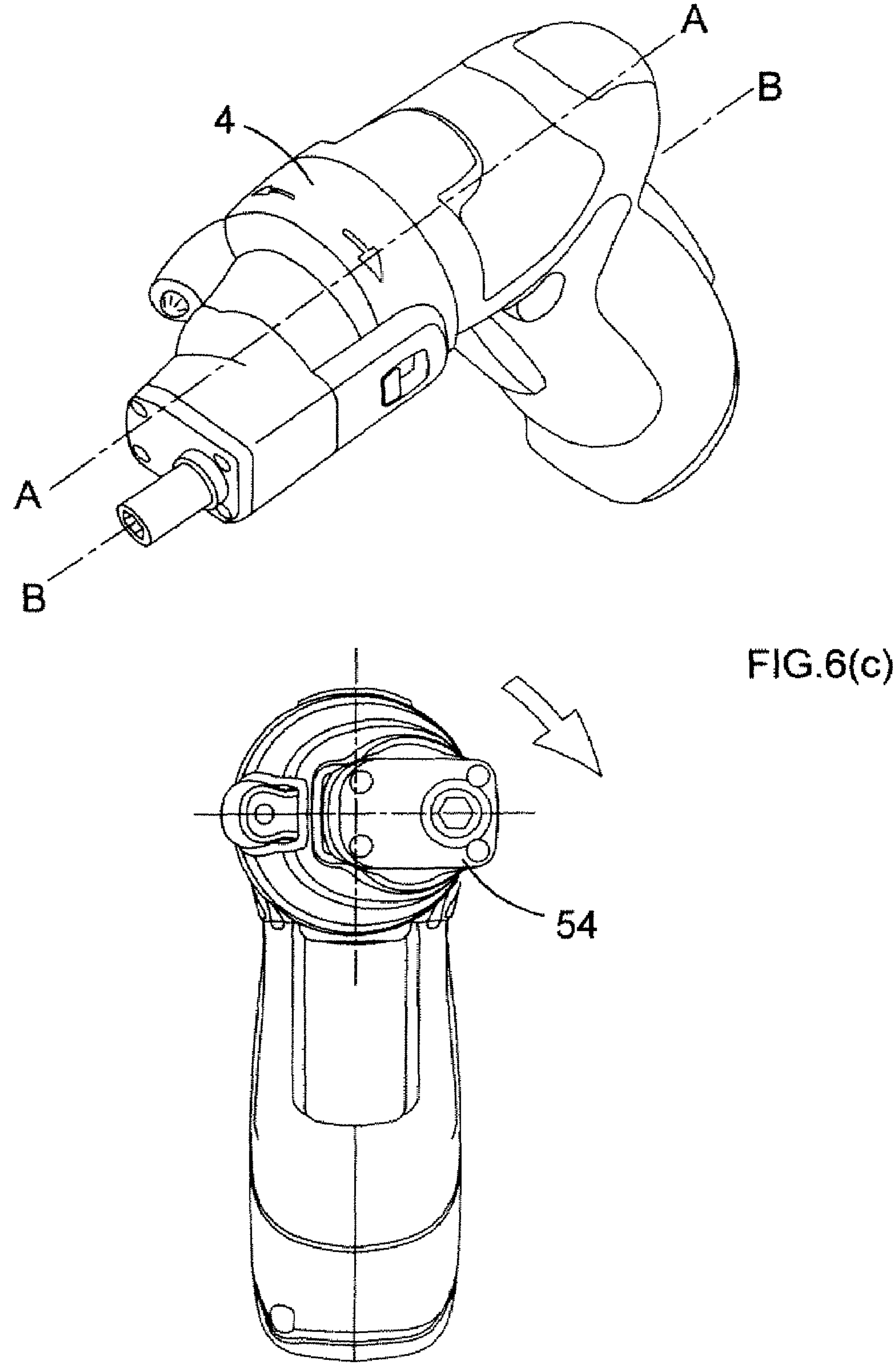
Figure 7A:
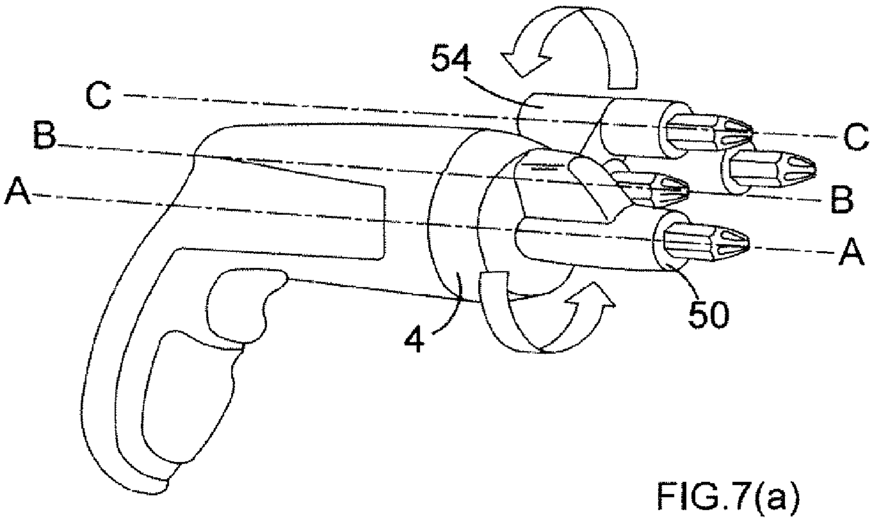
FIG. 7 illustrates schematically four views of possible orientations of the output drive of a further embodiment of a drill/driver in accordance with the present invention.
Figure 7B:
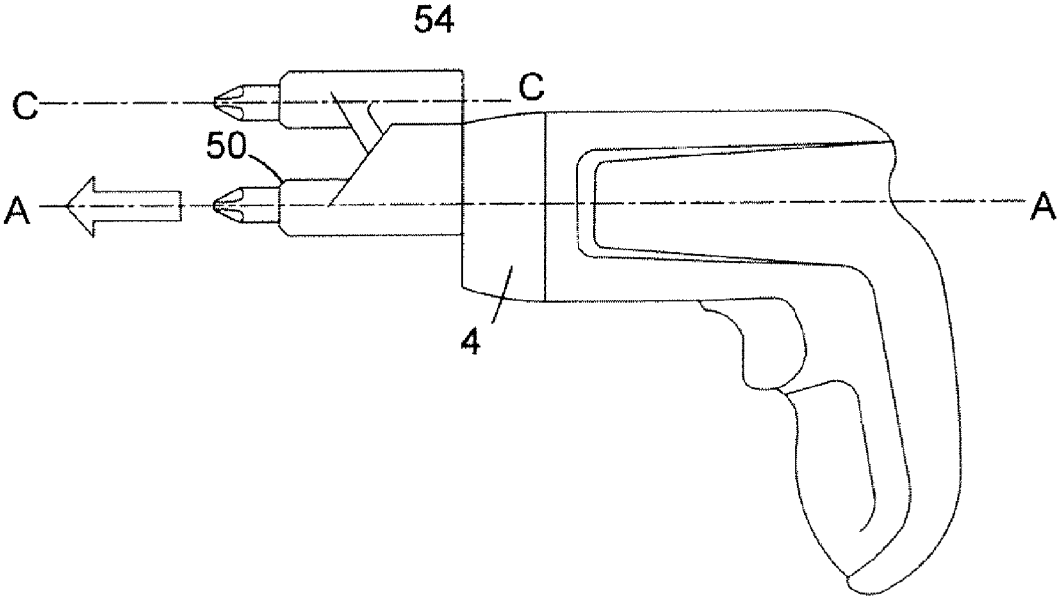
Figure 7C:
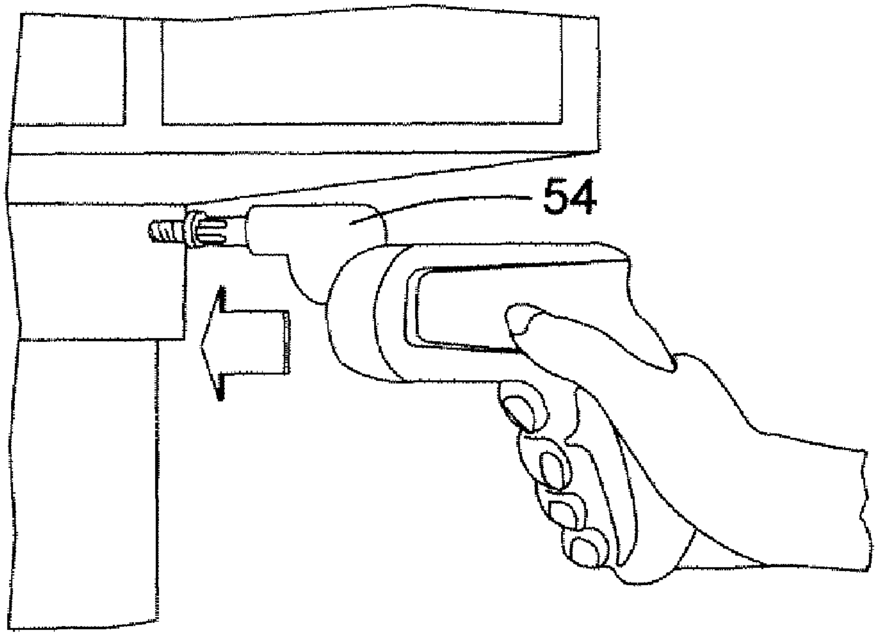
Figure 7D:
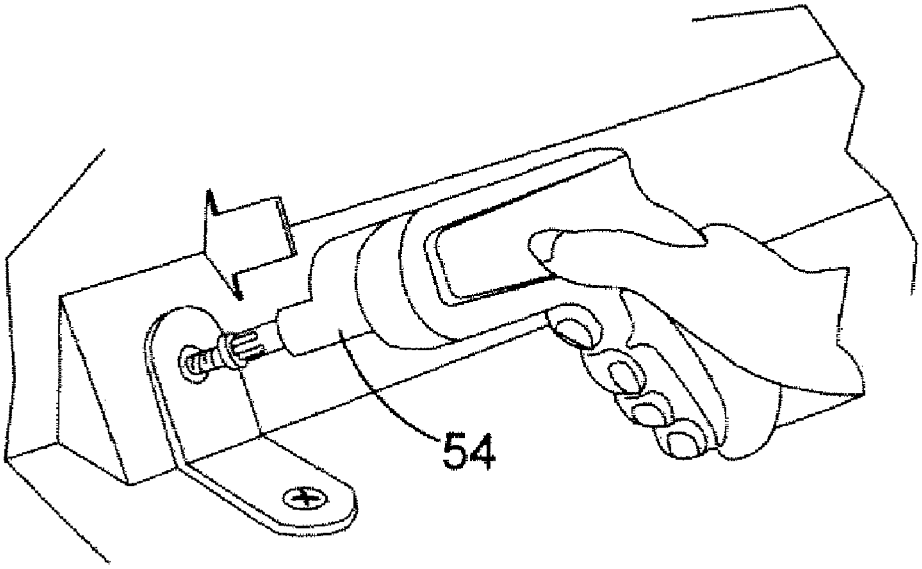

FIG. 6 is an end view which illustrates the effect of the angular position of the axis B-B of the drill driver caused by rotation of the casing 4, (and, hence the shaft 32) about the central axis A-A. The user needs only to apply sufficient torque manually to the casing 4 in whichever rotational direction desired to move the shaft 32 circumferentially. This rotational movement of the casing 4 causes rotation of the bearing 34 about the output shaft 26. As mentioned above, the bearing 34 is non-rotationally fixed to the inside of the casing 4 thereby preventing any relative rotation therebetween. Hence, applied torque of sufficient force to the casing 4 to rotate causes the gear 30 to roll over its intermeshing gear 28. The transmission of torque from the motor 6 to the shaft 32 is achieved regardless of the circumferential position of the shaft 32 about the central axis A-A. This permits the operator of the drill/driver to be able to select at which circumferential position on the output face 38 of the outer casing 4 the shaft 32 and, hence, the second axis, B-B, is positioned. Such a facility is useful if, for example, an obstruction prevents ease of use of the drill/driver in a certain position. Had the shaft 32 been fixed in circumferential disposition about the central axis A-A, this adjustment feature would not have been possible.

The distal end 40 of the shaft 32 carries an output gear or pinion 42. The pinion 42 is non-rotationally fixed to the shaft 32 so that rotation of the shaft 32 causes concomitant rotation of the pinion 42. Also at the distal end 40 of shaft 32—but beyond the pinion 42—is mounted a bearing 44. The bearing 44 is journalled for free rotation about the shaft 32 via central channel 46. Also formed within bearing 44 is a further channel 48 through which a final output shaft 50 of the drill driver passes and in which channel 48 the shaft 50 is freely rotatable.

Mounted non-rotatably on the final output shaft 50 is a second offset output gear 52. The second output gear 52 meshes with and is driven by the pinion 42 mounted on the shaft 32. As with the relationship between the gears 28 and 30 above, on rotation of gear 42 (as a result of rotation of the shaft 32), the final output gear 52 also rotates in order to rotate the final output shaft 50.

Because the bearing 44 is freely rotatable about the distal end 40 of the shaft 32, if the operator applies sufficient torque thereto (via outer casing 54, which is non-rotatably secured to the outside of the bearing 44), then the locus of the axis of the output shaft 50 can be varied. Analogous again to the situation of the output shaft 32, the final output shaft 50 can be moved 360° about channel 46 of the bearing 44 by such operator-induced rotation. In FIGS. 2 and 3, the locus of the output shaft 50 is aligned exactly with the axis A-A. However, the locus of the output shaft 50 can be chosen to vary anywhere about its centre (channel 46) between the drill/driver central axis A-A and the locus of the peripheral circumference defined by the axis B-B.

Figure 5:
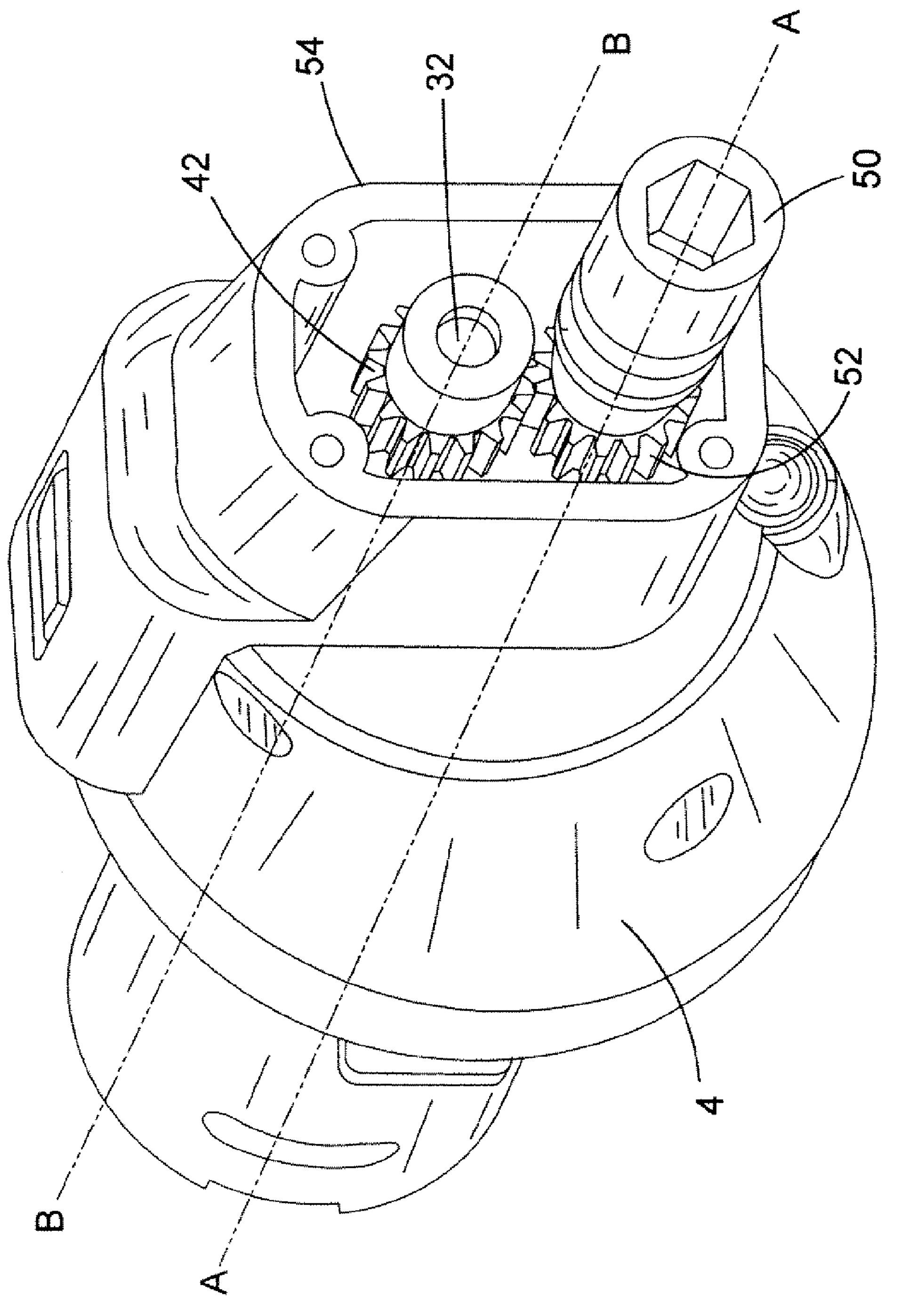
FIG. 5 shows a cut-away perspective view of the first and second offset output gears of the drill/driver mechanism of FIG. 2.

Reference now also to FIG. 5 shows the structural relationship between the two output shafts 32 and 50, although the pinion 42 hides the shaft 32 on which it is mounted. The casing 54 is pivotable about its axis B-B defined by the locus of shaft 32 (this being the centre about which gear 42 rotates). In the position shown in FIG. 5 the shaft 50 is centred along the central drill/driver axis A-A. But on rotation of the casing 54 the locus of the axis of rotation of the shaft 50 alters to move in a circle about the centre of the shaft 32/pinion 42 as described above.

Reference to FIG. 6 shows a range of possible of angular dispositions of the casing 54 about the central axis A-A, thereby to selectively vary the position of the axis B-B thereabout.

FIG. 7(*a*) shows how rotation of the final output shaft 50 about channel 46 (see FIG. 3) causes the radial position of the shaft 50 be adjustable between the central axis A-A and an outer axis C-C which is itself radially beyond the peripheral edge of the drill/driver. Shown at FIG. 7(*b*) are the two extremes (i.e. 180° apart) of the positions of the output shaft 50. Axis A-A is the central drive axis of the drill/driver and C-C is the extreme radial axis about which the final output shaft 50 can rotate.

FIG. 7(*c*) illustrates use of the drill/driver with the final output shaft 50 in its extreme radially outer position rotating about axis C-C. Whereas FIG. 7(*d*) illustrates the final output shaft in the radially inner position where it rotates about the central drive axis A-A.

Although the rotation of the casing 4 is not shown in FIGS. 7 (*a*)-(*d*), from the above description it will be understood that the operator of the drill/driver needs only to rotate the casing 4 to adjust the angular disposition of the casing 54 thereabout. Clearly, if the casing 54 were aligned such that the shaft 50 is collinear with the central axis A-A (as is the case in FIG. 7(*d*)), then no difference is observed. However, when the casing 54 is oriented such that the shaft is in its radially outer position (as is the case with FIG. 7(*c*)), then the circumferential position of the axis B-B (and, hence also the outer axis C-C) about the drill/driver changes.

In a preferred embodiment of the present invention there is provided the facility to lock either or both of the output shafts 32 and/or 50 against rotation about their respective axes. This can be seen from the illustrations in FIG. 8.

Figure 8A:
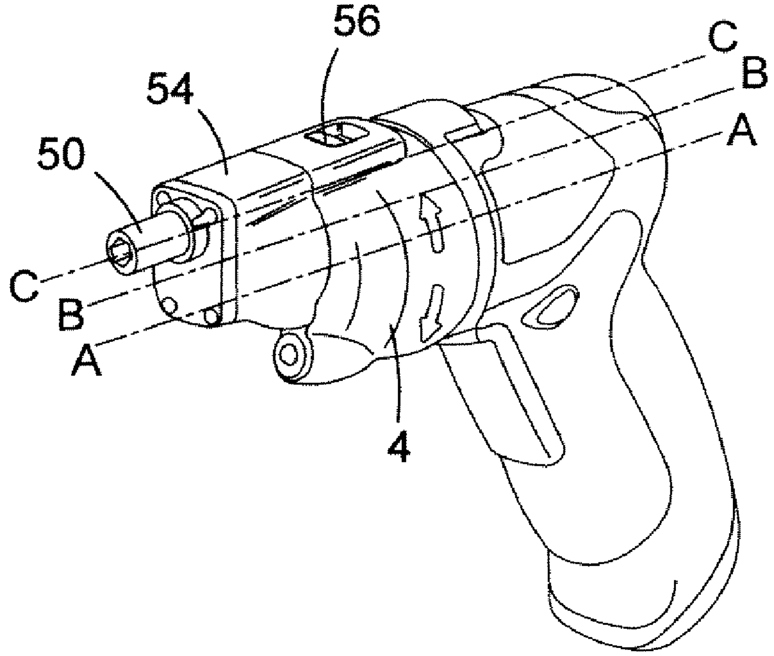
FIGS. 8 (*a*) and (*b*) illustrate schematically two possible positions of another embodiment of a drill/driver employing the locking mechanism of FIG. 10.
Figure 8B:
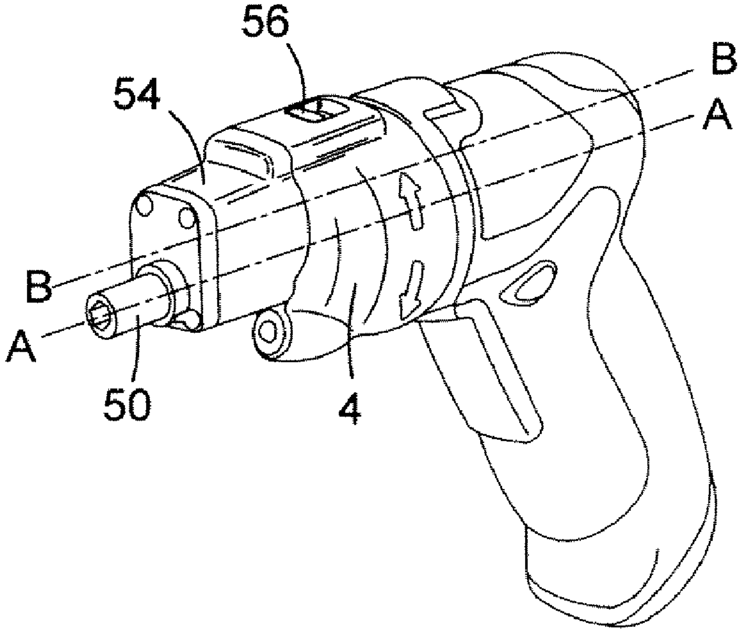

FIG. 8(*a*) shows that the final output shaft 50 has been rotated (via its casing 54) so that it rotates about and is aligned with the external axis C-C which is radially outside the drill/driver peripheral axis B-B. This means that the final output drive rotation of the drill/driver is beyond the peripheral edge of its body. Such might be useful, for example, in the situation of needing to apply drive to a screw located at the inner corner of a cabinet, or the like. A shaft lock, in this example a slider 56, is provided to selectably lock the casing 54 in this position to prevent any further rotation thereof until the operator releases the shaft lock.

In FIG. 8 (*b*) the final output shaft 50 has been rotated with respect to the attitude shown in FIG. 8 (*a*) so that it is collinear with the drill/driver central axis A-A. It will be appreciate that FIGS. 8 (*a*) and (*b*) illustrate the extremes of travel of the final output shaft 50, in that they shown the extent of its radial travel.

Shown in FIG. 9 is another form of lock, this being the collar 60. The collar 60 is of known type and is slid axially toward or away from the casing 4 thereby to selectably restrain from or allow free rotation of the casing 4 about central drive axis A-A. Although not illustrated in FIG. 9, this permits alteration of the circumferential position of the axis B-B about the central drive axis A-A. The precise method by which the slidable collar 60 achieves locking of the casing 4 against rotation is not described herein, as numerous methods—all well known to those skilled in the art—are possible to achieve this.

Figure 10:
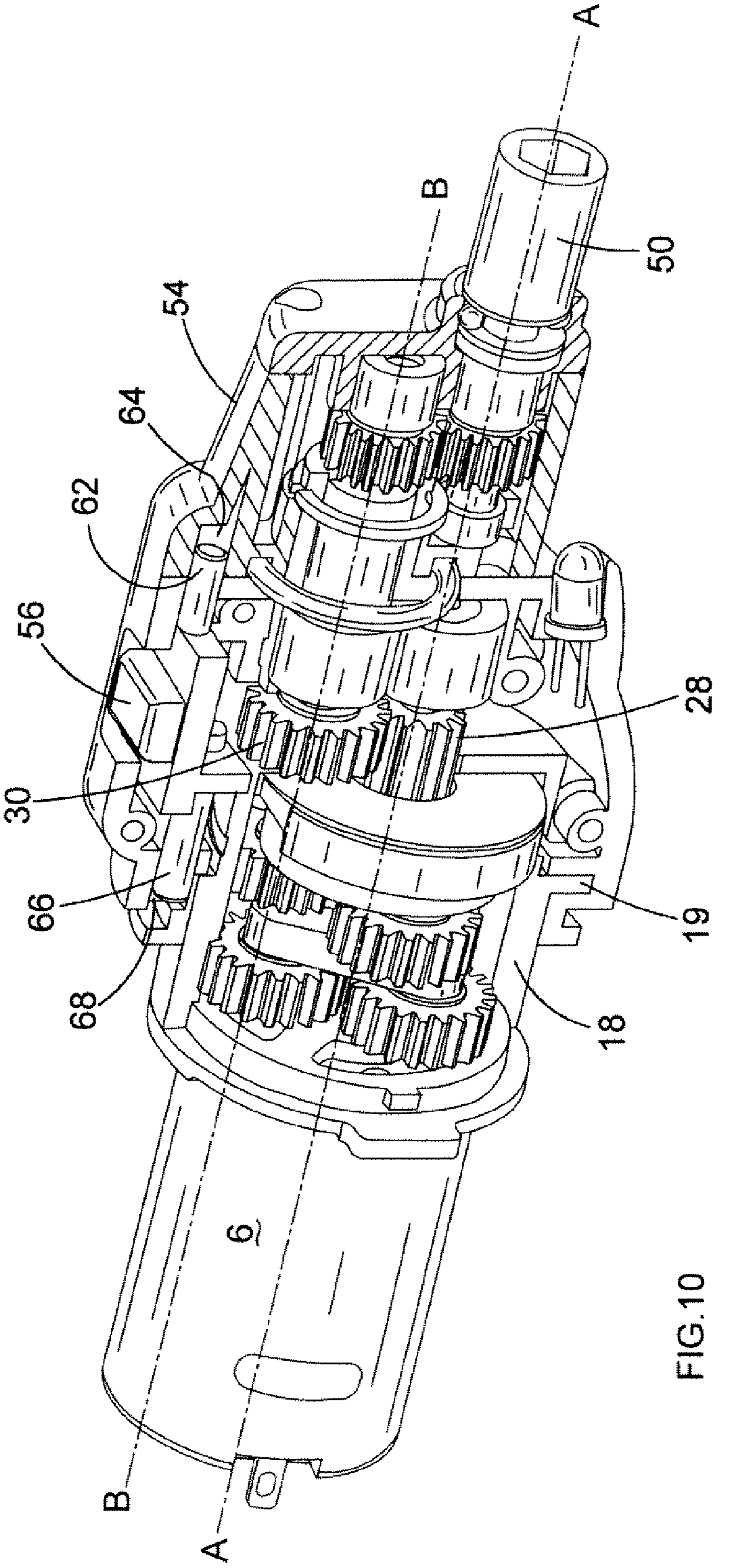
FIG. 10 shows a part cut-away view of the gear and locking mechanism employed in the drill/driver yet a further embodiment of the present invention.

Reference to FIG. 10 shows how another embodiment of the present invention employs another type of locking device to those illustrated above. In this example, a slider 56 is again sited between the gearbox internal ring gear 18 and the casing 4. However, unlike the other locking arrangements described above, this example is able to lock against rotation both casing 4 and 54. The right hand portion of the slider 56, as viewed in FIG. 10, has a projecting pin 62 which can be disengaged, under action of movement to the left of the slider 56, from a corresponding recess 64 formed in the gearbox arrangement 54.

When the operator has moved the slider 56 to the left so that the pin 62 is disengaged from the recess 64, then rotation of the gearbox arrangement 54 relative to the casing 4 is possible. This means that the position of the shaft 50 about the drive axis B-B is free to rotate. In this example the axis B-B is shown in the "12 o'clock" position relative to the central axis A-A.

The slider 56 has formed on its left side (opposite to that of pin 62) a further projecting pin 66. This pin 66 can be disengaged, under action of movement to the right of the slider 56, from a corresponding recess 68 formed in the locating flange 19 on the exterior of the internal ring gear 18. When this occurs, rotation of the gearbox arrangement 54 relative to the casing 4 is impossible and both can be rotated together relative to internal ring gear 18, hence, the position of the axis B-B/drive shaft 50 (not shown) about the central axis A-A can vary.

The slider 56 may also be positioned centrally between the two extreme positions described above. In which case neither pin 62 nor pin 66 engage with their respective recesses 64, 68. In this case, therefore, both casings 4 and 54 are unable to rotate.

Although in the examples given above the first offset output gear 30 and the second offset output gear 52 are driven by and coupled to the gearbox output shaft 26 and first offset output shaft 30 respectively, it is not necessary that this relationship be a direct engagement. An indirect drive via an intermediate gear arrangement, for example, is equally efficacious. This is, of course the case shown in FIG. 2, where the gear 30 provides drive (or torque transfer) to gear 52 via shaft 30 and gear, or pinion 42.

The invention claimed is:

1. A drill/driver including: a motor (6) for rotating a motor output shaft (14); a gearbox (16,18,20,22,24) coupled to the motor output shaft (14) and having a gearbox output shaft (26), the gearbox arranged to provide a change in rotational speed as between the motor output shaft (14) and the gearbox output shaft (26) and wherein the gearbox output shaft defines a first central output axis (A-A) of the drill/driver;

a first offset output gear (30) driven by and coupled to the gearbox output shaft (26), wherein the first offset output gear is radially offset from the first central output axis (A-A) and is freely rotatable thereabout; the first offset output gear itself defining a second axis (B-B), which second axis is offset from, parallel to and rotatable about the first central output axis (A-A);

a second offset output gear (52) driven by and coupled to the first offset gear (30), wherein the second offset output gear is radially offset from the second axis (B-B) defined by the first output gear (30) and wherein the second offset output gear (52) is freely rotatable about the second axis (B-B);

wherein the first and second offset output gears (30,52) are rotatably adjustable about the first central output axis (A-A) and the second axis respectively, thereby to permit the second offset gear to be selectably co-axial with the first central output axis, or radially offset therefrom, and wherein the second offset output gear drives a final output shaft (50) of the drill/driver.

2. A drill/driver according to claim 1 wherein the first offset output gear (30) drives a first offset drive shaft (32), the first offset drive shaft being parallel to, but axially offset from the first central output axis.

3. A drill/driver according to claim 2 wherein the first offset drive shaft (32) carries, at its end remote from the first offset output gear, a pinion (42), which pinion engages the second offset output gear (52).

4. A drill/driver according to claim 2 wherein the first offset drive shaft (32) sits within a first bearing (34), which first bearing is journalled for rotation about the first central output axis (A-A).

5. A drill/driver according to claim 2 wherein the final output shaft (50) sits within a second bearing (44), which second bearing is journalled for rotation about the first offset drive shaft (50).

6. A drill/driver according to claim 2 including a shaft lock (56) for selectably locking either or both of the first offset drive shaft and/or the final output shaft against free rotation about their respective axes.

7. A drill/driver according to claim 1 wherein the second offset output gear (52) is coupled to, and drives, the final output shaft (50) of the drill/driver.

8. A drill/driver according to claim 1 wherein a case (4) is manually rotatable by a user of the drill/driver to rotate the position of the first offset output gear (30) about the first central output axis (A-A).

9. A drill/driver according to claim 8 wherein an outer casing (54) is manually rotatable by a user of the drill/driver to rotate the position of the second offset output gear (52) about the second axis (B-B).

10. A drill/driver according to claim 9 wherein a shaft lock (56) acts to selectably lock either the case (4) against free rotation or the outer casing (54) against free rotation.

11. A drill/driver according to claim 10 wherein the shaft lock (56) locks both the casing (4) and the outer casing (54) against any rotation relative to each other.

12. A drill/driver according to claim 1 wherein the output shaft (50) terminates in a hexagonal bit holder.

* * * * *